United States Patent Office 3,457,292
Patented July 22, 1969

3,457,292
ARYL ALKOXYTHIOUREAS
Rayner S. Johnson, Carrcroft, Wilmington, Del., assignor to E. I. du Pont de Nemours and Company, Wilmington, Del., a corporation of Delaware
No Drawing. Continuation-in-part of application Ser. No. 286,905, June 11, 1963. This application Oct. 21, 1966, Ser. No. 588,290
Int. Cl. C07c *157/10, 157/06, 157/08*
U.S. Cl. 260—453                          14 Claims

ABSTRACT OF THE DISCLOSURE

Various aryl alkoxythioureas having the formula:

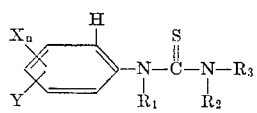

wherein

X is hydrogen, methyl, chloro, bromo or fluoro;
Y is hydrogen, chloro, bromo, fluoro, nitro, alkyl of less than 5 carbon atoms, or alkoxy of less than 5 carbons;
$n$ is a positive integer selected from 1 or 2 provided $n$ is 1 when Y is other than hydrogen;
$R_1$ and $R_2$ can be the same or different and are hydrogen, alkyl of less than 5 carbon atoms, or alkoxy of less than 5 carbon atoms, with at least one of $R_1$ and $R_2$ being alkoxy; and $R_3$ is alkyl of less than 5 carbon atoms, preferably methyl;
provided that when $R_2$ and $R_3$ are both alkyl, the total number of carbon atoms in $R_2$ and $R_3$ is less than 6 are useful as (1) herbicides and (2) intermediates for preparing formamidine compounds which are useful as fungicides.

---

This application is a continuation-in-part application of my copending U.S. application, Ser. No. 286,905, filed June 11, 1963 now abandoned, which is a continuation-in-part application of my then copending U.S. application Ser. No. 59,848, filed Oct. 3, 1960, now abandoned.

DESCRIPTION OF THE INVENTION

The compounds of this invention possess outstanding utility for selective weed control in crops. They have been found to be characterized by a remarkably favorable rate of disappearance from soil after application, thus avoiding lingering residual action remaining in the soil after the peak desired period for weed control is past. Further, the perchloromethylmercaptan derivatives of these compounds are useful as fungicides.

The compounds of this invention are represented by the formula:

(1)

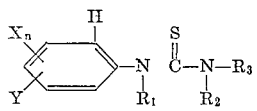

where:

X is hydrogen, methyl, chloro, bromo, or fluoro;
Y is hydrogen, chloro, bromo, fluoro, nitro, alkyl of less than 5 carbon atoms, or alkoxy of less than 5 carbons;
$n$ is a positive integer selected from 1 or 2 provided $n$ is 1 when Y is other than hydrogen;

$R_1$ and $R_2$ can be the same or different and are hydrogen, alkyl of less than 5 carbon atoms, or alkoxy of less than 5 carbon atoms, with at least one of $R_1$ and $R_2$ being alkoxy; and
$R_3$ is alkyl of less than 5 carbon atoms, preferably methyl;

provided that when $R_2$ and $R_3$ are both alkyl, the total number of carbon atoms in $R_2$ and $R_3$ is less than 6.
Preferred because of their outstanding herbicidal activity and ease of dissemination are those compounds in Formula 1 where X is methyl or halogen.

PREPARATION

The compounds of this invention that have the alkoxy group on the non-aromatic nitrogen can be prepared by reacting an amine, such as N,O-dimethylhydroxylamine, with phenyl isothiocyanate or an appropriately substituted phenyl isothiocyanate, in an inert solvent such as benzene, xylene, dioxane, or methylene chloride. The amine can be conveniently added to a solution of the isothiocyanate gradually until there is a slight excess of the amine. After heating the reaction mixture at reflux temperature for about 30 minutes, the solvent is evaporated, leaving essentially pure product in substantially quantitative yield.

The aryl thiourea compounds of this invention that have an alkoxy group on the aromatic nitrogen can be prepared by reacting an alkyl isothiocyanate, an N,N-dialkylthiocarbamyl chloride, or an N-alkyl-N-alkoxythiocarbamyl chloride, with a suitable substituted N-alkoxylaniline, in an inert solvent such as benzene, dioxane, ether or toluene. The N-alkoxyanilines can be prepared by the acid hydrolysis of an N-alkoxy-N-phenyl-N'-alkylurea.

O-alkylhydroxylamine and N,O-dialkylhydroxylamine reagents required for the processes referred to above can be prepared through the alkylation of carbethoxyhydroxamic acid ($C_2H_5OCONHOH$) and subsequent hydrolysis. O-N-alkylhydroxylamines are also obtained by the reaction of alkyl halides with O-alkylhydroxylamines. For further details see Ann. 252 230 (1889); J. Chem. Soc. 514 (1952); Research (London) 3 190–1 (1950); Chem. Abstracts 44 8717; and J.A.C.S. 50 1479 (1928).

Thus by the above routes, compounds within the scope of this invention, such as the following illustrative ones can be prepared:

3-phenyl-3-methoxy-1-methylthiourea
3-phenyl-3-methoxy-1-ethylthiourea
3-phenyl-3-methoxy-1-n-propylthiourea
3-phenyl-3-methoxy-1-isopropylthiourea
3-phenyl-3-methoxy-1-n-butylthiourea
3-phenyl-3-methoxy-1-sec.-butylthiourea
3-phenyl-3-methoxy-1-tert.-butylthiourea
3-(m-chlorophenyl)-3-methoxy-1-methylthiourea
3-(o-chlorophenyl)-3-butoxy-1-methylthiourea
3-(3-chloro-4-isopropylphenyl)-1-methyl-1-methoxythiourea
3-(3-chloro-4-methylphenyl)-1-methyl-1-methoxythiourea
3-(3-nitro-4-chlorophenyl)-1-methyl-1-methoxythiourea
3-(3-chloro-4-methoxyphenyl)-1-methyl-1-methoxythiourea
3-(3-bromo-4-butoxyphenyl)-1-methyl-1-methoxythiourea
3-(3,4-dimethylphenyl)-1-methyl-1-methoxythiourea
3-(3,4-dichlorophenyl)-1,3-dimethyl-1-methoxythiourea
3-(3,4-dichlorophenyl)-3-butyl-1-ethyl-1-methoxythiourea
3-(p-chlorophenyl)-3-isopropyl-1-propyl-1-methoxythiourea
3-(3,4-dichlorophenyl)-1,3-dimethoxy-1-methylthiourea
3-(p-fluorophenyl)-1,3-dimethyl-1-methoxythiourea
3-(3-nitro-4-methylphenyl)-3-methyl-1-butyl-1-methoxythiourea A particularly preferred group of compounds within the present invention are:

3-(p-chlorophenyl)-3-methoxy-1-methylthiourea
3-(3,4-dichlorophenyl)-3-methoxy-1-methylthiourea
3-(p-chlorophenyl)-1-methyl-1-methoxythiourea
3-(3,4-dichlorophenyl)-1-methyl-1-methoxythiourea
3-(p-chlorophenyl)-3-methoxy-1,1-dimethylthiourea
3-phenyl-1-methyl-1-methoxythiourea
3-phenyl-3-methoxy-1,1-dimethylthiourea
3-(3,4-dichlorophenyl)-3-methoxy-1,1-dimethylthiourea

PHYSICAL PROPERTIES

The substituted thioureas of this invention are solids. They are crystalline and exhibit high solubility in organic solvents. They are generally white or off-white in color, of low volatility and poorly soluble in water.

A particularly significant and valuable advantage possessed by the compounds of this invention is their unobvious ability to disappear from the soil at an extremely favorable rate after the peak period for needed weed control is passed. In addition, these compounds possess a high degree of herbicidal activity and are most effective as foliar herbicides and preemergence herbicides. Especially important is the unobvious ability of these compounds to provide effective but selective weed control when compared with prior art herbicides. The compounds are particularly useful in weed control among crops, such as field and sweet corn, sugar cane, sorghum, safflower, Sansevieria, and potatoes, where effective weed control is obtained without corresponding injury to the crop.

These compounds have been found to be soluble in many common solvents such as benzene, xylene, cyclohexanone, and the like, thereby making it possible to formulate them as liquid concentrates. In contrast, the conventional substituted urea herbicides are highly insoluble in such solvents.

COMPOSITIONS AND APPLICATION

The compounds of this invention can be applied directly or formulated into compositions and applied to the area to be treated according to methods fully described in detail in Luckenbaugh U.S. Patent No. 2,935,393 issued May 3, 1960. The disclosure of that patent relating to compositions and methods of application is herewith incorporated by reference in its entirety.

Ordinarily, the herbicidal compounds of this invention will be applied to the area to be treated at a rate from 0.25 to 100 pounds per acre. When formulated with other materials, such materials can include fertilizer materials, other pest control agents such as insecticides and fungicides, and other herbicides. Highly effective herbicidal compositions can be prepared comprising at least one compound of this invention in admixture with another herbicidally active ingredient. In addition, the composition can contain one or more of the herbicidal composition adjuvants or conditioners fully described in the aforementioned Luckenbaugh patent, the pertinent disclosure of which is incorporated by reference herein.

It is often advantageous, and particularly desirable herbicidal effects can often be obtained if the herbicidal compounds of this invention are applied together with from 0.4 to 10 parts by weight of surface-active agent per one part by weight of herbicide.

Particularly useful compositions will contain, for each ten parts by weight of a compound of the present invention, another herbicidally active ingredient listed as follows in the indicated amounts expressed as parts by weight:

| Parts | Herbicide |
|---|---|
| | Ureas |
| 2–30 | 3-(3,4-dichlorophenyl)-1,1-dimethylurea. |
| 2–30 | 3-(4-chlorophenyl)-1,1-dimethylurea. |
| 2–30 | 3-phenyl-1,1-dimethylurea. |
| 2–30 | 3-(3,4-dichlorophenyl)-1-n-butyl-1-methylurea. |
| 2–30 | 3-(3,4-dichlorophenyl)-1,1,3-trimethylurea. |
| 2–30 | 3-(3,4-dichlorophenyl)-1-methyl-1-methoxyurea. |
| 2–60 | 3-(p-chlorophenoxyphenyl)-1,1-dimethylurea. |
| | Phenols |
| 0.1–400 | Dinitro-sec.-butylphenol and salts thereof. |
| 1.6–1,200 | Pentachlorophenol and salts thereof. |
| 0.1–400 | Sodium dinitrocresylate. |
| | Carboxylic Acids and Derivatives |
| 2–90 | 2-methoxy-3,5,6-trichlorobenzoic acid and salts thereof. |
| 1.5–70 | 2-methoxy-3,6-dichlorobenzoic acid and salts thereof. |
| .2–240 | 2,6-dichlorobenzonitrile. |
| 1.5–70 | 2,3,6-trichlorobenzoic acid and salts thereof. |
| .2–90 | 2,3,5,6-tetrachlorobenzoic acid and salts thereof. |
| .1–80 | 2,4-dichlorophenoxyacetic acid and salts and esters thereof. |
| .1–80 | 2,4,5-trichlorophenoxyacetic acid and salts and esters thereof. |
| .1–80 | (2-methyl-4-chlorophenoxy)acetic acid and salts and esters thereof. |
| .1–80 | 2-(2,4,5-trichlorophenoxy)propionic acid and salts and esters thereof. |
| .8–2,400 | 2,2-dichloropropionic acid and salts thereof. |
| 24–1,200 | 2-(2,4,5-trichlorophenoxy)ethyl-2,2-dichloropropionate. |
| .2–160 | 4-(2,4-dichlorophenoxy)butyric acid and salts and esters thereof. |
| .2–160 | 4-(2-methyl-4-chlorophenoxy)butyric acid and salts and esters therof. |
| 2.4–4,800 | Trichloroacetic acid and salts thereof. |
| 3–400 | N-phenylcarbamic acid, isopropyl ester. |
| 3–400 | N-(m-chlorophenyl)carbamic acid, isopropyl ester. |
| 3–400 | N-(m-chlorophenyl)carbamic acid, 4-chloro-2-butynyl esters. |
| .8–160 | N,N-dipropylthiolcarbamic acid, ethyl ester. |
| 1.5–70 | 2,3,6-trichlorophenylacetic acid and salts. |
| 3–240 | 2-chloro-N,N-diallylacetamide. |
| 3–320 | Maleic hydrazide. |
| 0.1–80 | 3-amino-2,5-dichlorobenzoic acid and salts thereof. |
| 0.1–80 | 3-nitro-2,5-dichlorobenzoic adic and salts thereof. |
| 1.5–70 | 2-methyl-3,6-dichlorobenzoic acid and its salts. |
| 1.5–70 | 2,3,6-trichlorobenzyloxypropanol. |
| 0.8–160 | N,N-di(n-propyl)thiolcarbamic acid, n-propyl ester. |
| 0.8–160 | N-ethyl-N-(n-butyl)thiolcarbamic acid, ethyl ester. |
| | Triazines |
| 2–30 | 2-chloro-4,6-bis(ethylamino)-s-triazine. |
| 2–30 | 2-chloro-4-ethylamino-6-isopropylamino-s-triazine. |
| 2–30 | 2-chloro-4,6-bis(methoxypropylamino)-s-triazine. |
| 2–30 | 2-methoxy-4,6-bis(isopropylamino)-s-triazine. |
| 2–30 | 2-isopropylamino-4-methoxyethylamino-6-methylmercapto-s-triazine. |
| 2–30 | 2-methylmercapto-4,6-bis(isopropylamino)-s-triazine. |
| 2–30 | 2-methylmercapto-4,6-bis(ethylamino)-s-triazine. |
| 2–30 | 2-methylmercapto-4-ethylamino-6-isopropylamino-s-triazine. |
| 2–30 | 2-methoxy-4,6-bis(ethylamino)-s-triazine. |
| 2–30 | 2-methoxy-4-ethylamino-6-isopropylamino-s-triazine. |
| 2–30 | 2-chloro-4,6-bis(isopropylamino)-s-triazine. |
| | Inorganic and Mixed Inorganic-Organic Salts |
| 7.5–400 | Octyl-dodecylammonium methylarsonate. |
| 4–300 | Sodium arsenite. |
| 3,200–130,000 | Lead arsenate. |
| 1,600–65,000 | Calcium arsenate. |
| 900–32,000 | Sodium tetraborate hydrated, granulated. |
| 900–32,000 | Sodium metaborate. |
| 900–32,000 | Sodium pentaborate. |
| 900–32,000 | Unrefined borate ore such as borascu. |
| 2.5–2,000 | Sodium chlorate. |
| 4–800 | Ammonium sulfamate. |
| .1–240 | 5,6-dihydro-(4A,6A)-dipyrido-(1,2-A,2′,1′-C)-pyrazinium dibromide. |
| 2–1,600 | Calcium propylarsonate. |
| 7.5–400 | Disodium monomethylarsonate. |
| 7.5–400 | Dimethylarsinic acid. |
| 900–32,000 | Polyborchlorate. |
| 2.5–40 | Ammonium thiocyanate. |
| | Others |
| 2.5–40 | 3-amino-1,2,4-triazole. |
| 2.5–40 | 3,6-endohexahydrophthalic acid. |
| 2–1,600 | Hexachloroacetone. |
| 5–100 | Diphenylacetonitrile. |
| 5–100 | N,N-dimethyl-α,α-diphenylacetamide. |
| 5–40 | N,N-di(n-propyl)-2,6-dinitro-4-trifluoromethylanilino. |
| 5–400 | O-(2,4-dichlorophenyl)-o-methylisopropylphosphoramidothioate. |
| 5–300 | 2,3,5,6-tetrachloroterephthalic acid, dimethyl ester. |
| 0.5–60 | 2,4-dichloro-4′-nitrodiphenylether. |
| 10–600 | Chlordane. |
| 0.1–240 | 1,1′-dimethyl-4,4′-dipyridylium di-(methylsulfate). |
| 5–60 | N,N-di(n-propyl)-2,6-dinitro-4-methylaniline. |

The following examples, in which the parts are by weight, further illustrate the preparation, compositions and utility of the novel compounds and compositions according to this invention:

Example 1

A stirring solution of 196 parts of 3,4-dichlorophenyl-isothiocyanate and 200 parts of benzene is diluted with a solution of 75 parts of N,O-dimethylhydroxylamine and 100 parts of benzene at room temperature. This is stirred for an additional hour and the solvent is removed by distillation under reduced pressure leaving essentially pure 3-(3,4-dichlorophenyl)-1-methoxy-1-methylthiourea. A recrystallized portion melts at 114–115° C.

Additional compounds are prepared according to the procedure of Example 1 by substituting an equivalent amount of the following alkoxyamines (A) and isothiocyanates (B) for the isothiocyanate and amine of that example, to yield the product (C), as indicated.

Example:

2 (A) N,O-dimethylhydroxylamine
  (B) m-chlorophenylisothiocyanate
  (C) 3-(m-chlorophenyl-1-methoxy-1-methyl-thiourea
3 (A) N-(3,4-dichlorophenyl)-O-methylhydroxylamine
  (B) methylisothiocyanate
  (C) 3-(3,4-dichlorophenyl)-3-methoxy-1-methylthiourea
4 (A) N-(o-chlorophenyl)-O-butylhydroxylamine
  (B) methylisothiocyanate
  (C) 3-(o-chlorophenyl)-3-butoxy-1-methyl-thiourea
5 (A) N,O-dimethylhydroxylamine
  (B) 3-chloro-4-nitrophenyl-isothiocyanate
  (C) 3-(3-chloro-4-nitrophenyl)-1-methoxy-1-methylthiourea
6 (A) N,O-dimethylhydroxylamine
  (B) 3-chloro-4-isopropylphenylisothiocyanate
  (C) 3-(3-chloro-4-isopropylphenyl)-1-methoxy-1-methylthiourea
7 (A) N,O-dimethylhydroxylamine
  (B) p-bromophenylisothiocyanate
  (C) 3-(p-bromophenyl)-1-methoxy-1-methyl-thiourea

Example 8

A total of 19.2 parts of N-methoxy-3,4-dichloroamine and 10.7 parts of triethylamine dissolved in 100 parts of stirring benzene is gradually diluted with a solution of 12.3 parts of N,N-dimethylthiocarbamyl chloride dissolved in 50 parts of benzene. The entire reaction is refluxed for 30 minutes, cooled and filtered free of triethylamine hydrochloride. The filtrate stripped from the benzene solvent yields essentially pure 3-(3,4-dichlorophenyl)-3-methoxy-1,1-dimethylthiourea as the solid residue.

Example 9

3(3,4-dichlorophenyl)-3-methoxy-1-butyl-1-methylthiourea can be made similarly as in Example 8 by substituting an equivalent amount of N-butyl-N-methylthiocarbamyl chloride for the carbamyl chloride of Example 8.

Example 10

A total of 17.6 parts of N-methyl-3,4-dichloroaniline dissolved in 50 parts of toluene is added gradually to a stirring solution of 12.0 parts of thiophosgene dissolved in 110 parts of toluene containing 10.4 parts of triethylamine. The entire mixture is heated to reflux for 15 minutes, cooled and then diluted gradually with a solution containing 10.4 parts of triethylamine, 7.5 parts of N-methyl-O-ethylhydroxylamine and 50 parts of toluene. The entire mixture is stirred and heated at reflux for 15 minutes, then cooled and filtered to remove the triethylamine hydrochloride solid. Essentially pure 3-(3,4-dichlorophenyl)-1,3-dimethyl-1-ethoxythiourea is obtained from the toluene filtrate by removing the solvent via evaporation or reduced pressure distillation.

By substituting the equivalent amounts of the substituted amines tabulated below for N-methyl-3,4-dichloroaniline and N-methyl-O-ethylhydroxylamine of the preceding example, the following alkoxythioureas can be made.

| Ex. | | | |
|---|---|---|---|
| 11 | N-methyl-3,4-dichloroaniline. | N,O-dimethyl-hydroxylamine. | 3-(3,4-dichlorophenyl)-1,3-dimethyl-1-methoxythiourea. |
| 12 | N-ethyl-3,4-dichloroaniline. | ----do---- | 3-(3,4-dichlorophenyl)-3-ethyl-1-methoxy-1-methylthiourea. |
| 13 | N-ethoxy-3,4-dichloroaniline. | ----do---- | 3-(3,4-dichlorophenyl)-3-ethoxy-1-methoxy-1-methylthiourea. |
| 14 | ----do---- | Dimethylamine. | 3-(3,4-dichlorophenyl)-3-ethoxy-1,1-dimethylthiourea. |

Example 15

To demonstrate the herbicidal activity of the compounds of the preceding examples and others of this invention, they are applied at the rate of 0.5 to 4 pounds of active ingredient in the form of a spray in 25 to 100 gallons of water as a pre-emergence treatment for the control of crabgrass, giant foxtail, cheat, barnyard grass, mustard, chickweed, pigweed, lamb's-quarters, velvet leaf, and cockleburr in a field planted to corn. Excellent weed control is obtained. When applied as a directed post-emergence treatment to the above listed weeds as seedlings growing in established sugar cane, good weed control results are noted.

Example 16

The compounds of Example 1 through 14 are formulated into water-dispersible powder herbicidal compositions in accordance with the present invention to provide a composition suitable for dispersion in water to give a herbicidal spray. The water-dispersible powder compositions are made by intimately mixing the ingredients listed below using conventional mixing equipment and then grinding the mixture to give a powder having an average particle size less than about 50 microns.

| | Percent |
|---|---|
| Active ingredients | 75 |
| Fuller's earth | 23.75 |
| Sodium lauryl sulfate, 50% (wetting agent) | 1 |
| Methyl cellulose, 15 cps. (dispersing agent) | 0.25 |

This water-dispersible powder formulation is applied as a pre-emergence treatment in a newly planted field of corn. When applied at the rate of 0.5 to 1.5 pounds of active ingredient per acre in 50 gallons of water, excellent control of annual broadleaf and grass weeds, such as chickweed, mustard, lamb's-quarters, pigweed, crabgrass, and giant foxtail, is obtained.

Example 17

| | Percent |
|---|---|
| 3 - (3,4 - dichlorophenyl) - 1 - methoxy - 1 - methylthiourea | 3 |
| Granular attapulgite | 97 |

The above granular product is prepared by tumbling the attapulgite granules in a drum while spraying on a solution of the urea in acetone, then removing the acetone with heat.

Example 18

Example 17 is repeated, substituting the following formulation, with equally excellent results:

| | Percent |
|---|---|
| 3 - (3,4 - dichlorophenyl) - 1,3 - dimethyl - 1 - ethoxythiourea | 4 |
| Granular attapulgite | 96 |

The granular formulations of Examples 17 and 18 have outstanding utility as easy-to-apply applications for pre-emergence control of annual weeds in crops. When applied at the rate of 4 pounds of active ingredient per acre to ratoon sugar cane, excellent control of annual and broadleaf weeds is obtained.

Example 19

| | Percent |
|---|---|
| 3 - (m - chlorophenyl) - 1 - ethoxy - 1 - methylthiourea | 25 |
| Anhydrous sodium sulfate | 10 |
| Alkylnaphthalene sulfonic acid, sodium salt | 1 |
| Calcium, magnesium bentonite | 64 |

The finely divided components are first blended, then moistened with water and extruded. The wet extrusions are cut into small pellets which are then dried.

This formulation has excellent utility for control of weeds and brush on non-crop areas. At a rate of 30 pounds of active ingredient per acre, excellent control of annual and perennial broadleaf and grass weeds growing along fence rows, around farm buildings, and telephone poles, and along roadsides, is obtained. Quackgrass, goldenrod, jimson weed, wild mustard, and lovegrass are among the species that are controlled.

Example 20

The herein described compounds can be formulated into emulsifiable oil compositions of the following type by dissolving the urea and the conditioning agents in the organic diluent:

| | Percent |
|---|---|
| 3 - (3,4 - dichlorophenyl) - 1 - butoxy - 1 - methylthiourea | 15 |
| Xylene | 80 |
| Alkylaryl polyether alcohol | 5 |

This formulation can be repeated using a like amount of 3 - (3,4 - dichlorophenyl) - 3 - methoxy - 1,1 - dimethylthiourea for the urea in the formulation.

These emulsifiable oil formulations are applied each to separate areas at the rate of 1 to 3 pounds of active ingredient per acre in 40 gallons of water as a directed spray for seedling crabgrass, foxtail, mustard and pigweed growing in a field of Sansevieria. Excellent weed control is obtained.

Example 21

3 - (3,4 - dichlorophenyl) - 3 - ethoxy - 1,1 - dimethylthiourea is dissolved in Lion Herbicidal Oil No. 6 (1 pound of urea per 10 gallons of oil) and applied at the rate of 5 pounds of active ingredient per acre in 40 gallons of oil. This application gives excellent control of annual and perennial weeds growing along terraces, and irrigation pipes in a sugar cane field. This example is repeated using as the active ingredient and equal amount of 3 - (3,4 - dichlorophenyl) - 3 - ethoxy - 1 - methoxy - 1-methylthiourea, with equally outstanding results.

Example 22

| | Percent |
|---|---|
| 3-(3,4-dichlorophenyl)-3-ethoxy-1,1-dimethylthiourea | 75 |
| Fuller's earth | 23.75 |
| Sodium lauryl sulfate, 50% | 1.00 |
| Methyl cellulose, 15 cps. | 0.25 |

This wettable powder formulation is applied at the rate of 1.5 to 3 pounds of active ingredient per acre in 40 gallons of water as a directed post-emergence lay-by spray in sorghum and potatoes. Excellent control of seedling velvet leaf, pigweed, lamb's-quarters, foxtail and crabgrass is obtained.

As previously mentioned, the compounds of this invention are, surprisingly, precursors for useful fungicides. Thus the compounds can be reacted with perchloromethylmercaptan to produce aryl alkoxy-(trichloromethyldithio) formamidines of the following formula:

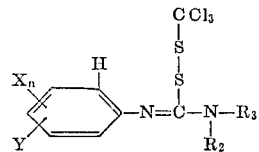

wherein:

X, Y, $R_2$, $R_3$ and $n$ are as previously set forth.

The following examples illustrate the preparation and utility of the perchloromethylmercaptan derivatives of the compounds of the invention.

Example 23

A solution of 3.72 parts of trichloromethanesulfinyl chloride in 35 parts of benzene is added dropwise to a stirred solution consisting of 5.3 parts of N'-(3,4-dichlorophenyl)-N-methoxy-N-methylthiourea and 1.58 parts of pyridine in 65 parts of benzene. The temperature of the solution increases to 32° during addition and a white precipitate is formed. After stirring for 1 hour, the solution is filtered and the insolubles are washed with benzene. The solvent is removed under reduced pressure and the resultant oil is stirred overnight under high vacuum. The product obtained is a viscous, yellow oil weighing 7.3 parts and is identified as N'-(3,4-dichlorophenyl)-N-methoxy-N-methyl - 1 - (trichloromethyldithio) formamidine.

Petri dish plates are prepared with the test compounds uniformly distributed in potato dextrose agar at dilutions ranging from 1:100 to 1:10,000. The treated agar is inoculated with Penicillium citrinum, Aspergillus niger 9462, Trichoderma sp. 9645, Rhizoctonia solani, Pythium sp., and Fusarium phaseoli. The inoculated plates are incubated at 83° F. and final observations on growth or lack of growth are recorded after eight days.

| | Growth at Indicated Dilution | | | | | | | | | | | |
|---|---|---|---|---|---|---|---|---|---|---|---|---|
| | N'-(3,4-dichlorophenyl) N-methoxy-N-methyl-1-(trichloromethyldithio) formamidine | | | | | | Control Tetramethyl thiuram disulfide (75% wettable powder) | | | | | |
| Fungi | P | R | F | Pc | A | T | P | R | F | Pc | A | T |
| Dilution: | | | | | | | | | | | | |
| 1:100 | 0 | 0 | 0 | 0 | 0 | 0 | 0 | 0 | 0 | 0 | 0 | 0 |
| 1:500 | 0 | 0 | 0 | 0 | 0 | 0 | 0 | + | + | 0 | 0 | 0 |
| 1:1,000 | 0 | 0 | 0 | 0 | 0 | 0 | 0 | + | + | 0 | 0 | 0 |
| 1:2,000 | 0 | 0 | + | 0 | 0 | 0 | Not tested | | | | | |
| 1:5,000 | Not tested | | | | | | + | + | + | 0 | 0 | 0 |
| 1:10,000 | + | + | + | + | + | + | + | + | + | 0 | 0 | 0 |

0=no growth. +=growth.
P=Pythium sp.
R=Rhizoctonia solani.
F=Fusarium phaseoli.
Pc=Penicillium citrinum.
A=Aspergillus niger, 9642.
T=Trichoderma sp., 9645.

Example 24

The following test corresponds to Federal Specification Textile Test Methods Code CCC-T-191B, Method 5751.

Eight-ounce cotton duck fabric is treated with a 1% solution of N'-(3,4-dichlorophenyl)-N-methoxy-N-methyl-1-(trichloromethyldithio)-formamidine in methylene chloride to give a 100% pick-up of the treating solution or a 1% pick-up on an active ingredient basis.

Strips of the treated cotton, 1″ by 6″ in size, are placed in mineral nutrient agar in 16 oz. jars and inoculated with a spore and mycelial suspension of Myrothecium verrucaria and Chaetomium globosum. The inoculated specimens are incubated at 83° F. for 14 days. Observation shows control of fungus growth on the treated fabric and heavy growth on the untreated fabric. Tensile strength measurements indicate that the treated fabric has retained much of its original strength, whereas the untreated fabric has completely deteriorated.

The invention claimed is:
1. A compound of the formula:

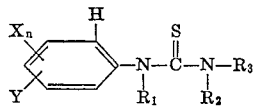

where:
X is selected from the group consisting of hydrogen, methyl, chloro, bromo, and fluoro;
Y is selected from the group consisting of hydrogen, chloro, bromo, fluoro, nitro, alkyl of less than 5 carbons, and alkoxy of less than 5 carbons;
n is a positive integer selected from 1 or 2 provided n is 1 when Y is other than hydrogen;
$R_1$ and $R_2$ are selected from the group consisting of hydrogen, alkyl of less than 5 carbons, and alkoxy of less than 5 carbons, with at least one of $R_1$ and $R_2$ being alkoxy; and,
$R_3$ is alkyl of less than 5 carbons; provided that when $R_2$ is alkyl, the total number of carbon atoms in $R_2$ and $R_3$ is less than 6.

2. A compound of claim 1 wherein X is methyl or halogen.

3. A compound of the formula:

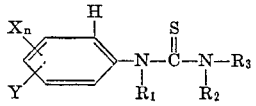

where:
X is selected from the group consisting of hydrogen, methyl, chloro, bromo, and fluoro;
Y is selected from the group consisting of hydrogen, chloro, bromo, fluoro, nitro, alkyl of less than 5 carbons, and alkoxy of less than 5 carbons;
n is a positive integer selected from 1 or 2 provided n is 1 when Y is other than hydrogen;
$R_1$ is selected from the group consisting of alkoxy of less than 5 carbons;
$R_2$ is selected from the group consisting of hydrogen, alkyl of less than 5 carbons, and alkoxy of less than 5 carbons; and,
$R_3$ is alkyl of less than 5 carbons; provided that when $R_2$ is alkyl, the total number of carbon atoms in $R_2$ and $R_3$ is less than 6.

4. 3-(p-chlorophenyl)-4-methoxy-1-methylthiourea.
5. 3-(3,4-dichlorophenyl)-3-methoxy-1-methylthiourea.
6. 3-(p-chlorophenyl) - 3 - methoxy-1,1-dimethylthiourea.
7. 3-phenyl-3-methoxy-1,1-dimethylthiourea.
8. 3-(3,4-dichlorophenyl) - 3 - methoxy-1,1-dimethylthiourea.

9. A compound of the formula:

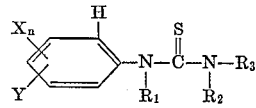

where:
X is selected from the group consisting of hydrogen, methyl, chloro, bromo, and fluoro;
Y is selected from the group consisting of hydrogen, chloro, bromo, fluoro, nitro, alkyl of less than 5 carbons, and alkoxy of less than 5 carbons;
n is a positive integer selected from 1 or 2 provided n is 1 when Y is other than hydrogen;
$R_2$ is alkoxy of less than 5 carbons; and
$R_3$ is alkyl of less than 5 carbons.

10. 3-(p-chlorophenyl)-1-methyl-1-methoxythiourea.
11. 3 - (3,4 - dichlorophenyl)-1-methyl-1-methoxythiourea.
12. 3-phenyl-1-methyl-1-methoxythiourea.
13. A compound of the formula:

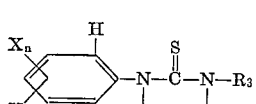

where:
X is selected from the group consisting of hydrogen, methyl, chloro, bromo, and fluoro;
Y is selected from the group consisting of hydrogen, chloro, bromo, fluoro, nitro, alkyl of less than 5 carbons, and alkoxy of less than 5 carbons;
n is a positive integer selected from 1 or 2 provided n is 1 when Y is other than hydrogen;
$R_1$ is alkyl of less than 5 carbon atoms;
$R_2$ is alkoxy of less than 5 carbon atoms; and
$R_3$ is alkyl of less than 5 carbon atoms.

14. 3-(3,4-dichlorophenyl) - 1,3 - dimethyl-1-methoxythiourea.

References Cited

UNITED STATES PATENTS 2,655,447 10/1953 Todd.
2,960,534 11/1960 Scherer et al.
3,213,121 11/1965 Smathers _____ 260—453

FOREIGN PATENTS 1,076,117 2/1960 Germany.

CHARLES B. PARKER, Primary Examiner
S. T. LAWRENCE, Assistant Examiner

U.S. Cl. X.R.

71—83, 93, 99; 260—454, 543. 577; 424—326

PO-1050
(5/69)

UNITED STATES PATENT OFFICE
CERTIFICATE OF CORRECTION

Patent No. 3,457,292  Dated July 22, 1969

Inventor(s) Rayner S. Johnson

It is certified that error appears in the above-identified patent and that said Letters Patent are hereby corrected as shown below:

In the claims, Claim 4, the compound should read as follows:

-- 3-(p-chlorophenyl)-3-methoxy-1-methylthiourea. --

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents